United States Patent
Doell et al.

[11] Patent Number: 6,161,963
[45] Date of Patent: Dec. 19, 2000

[54] WHEEL BEARING ASSEMBLY

[75] Inventors: Andreas Doell, Frankfurt; Michael Kautenburger, Bad Homburg; Marc-Oliver Rettig, Frankfurt; Michael Schorn, Bad Camberg, all of Germany

[73] Assignee: Continental Teves AG & Co. OHG, Germany

[21] Appl. No.: 09/167,390

[22] Filed: Oct. 6, 1998

[30] Foreign Application Priority Data

Oct. 9, 1997 [DE] Germany ............ 197 44 552

[51] Int. Cl.⁷ ...................................... F16C 19/08
[52] U.S. Cl. ................................ 384/541; 384/544
[58] Field of Search .................... 384/544, 537, 384/541, 589, 585

[56] References Cited

U.S. PATENT DOCUMENTS 5,301,774  4/1994  Cho et al. .

FOREIGN PATENT DOCUMENTS

| 0736398 | 10/1996 | European Pat. Off. . |
| 2472979 | 12/1980 | France . |
| 3012420 | 10/1981 | Germany . |
| 3537001 | 4/1986 | Germany . |
| 4339847 | 6/1995 | Germany . |
| 19528872 | 2/1997 | Germany . |

*Primary Examiner*—Lenard A. Footland
*Attorney, Agent, or Firm*—Rader, Fishman & Grauer PLLC

[57] ABSTRACT

An arrangement for bearing a non-driven wheel in an automotive vehicle or the like, includes a carrier unit, a wheel hub and an anti-friction bearing.

The arrangement provides that
the wheel hub (1) is integrally formed with a trunnion;
a one-piece or bipartite inner ring (2a) of the anti-friction bearing (2) is secured to the trunnion (1a), and
an axle body (3) having a bore (3a) for accommodating an outer ring (2b) of the anti-friction bearing (2) is provided as the carrier unit.

As the outer ring of the anti-friction bearing is arranged directly in the axle body (3), no screw operation is any longer required for securing the bearing means to the vehicle. As the inner ring is secured to the trunnion (1a) of the wheel hub (1) by roll rivets, there is no need for the otherwise required bearing adjustment during final assembly. The measures according to the invention involve the advantage that the number of components and also the efforts to be taken in the final assembly are decreased.

8 Claims, 1 Drawing Sheet

WHEEL BEARING ASSEMBLY

BACKGROUND OF THE INVENTION

The present invention is concerned with an arrangement for bearing a non-driven wheel, comprising a carrier unit, a wheel hub and an anti-friction bearing.

In arrangements of the afore-going type, the carrier unit frequently comprises an axle journal in communication with a holder on the vehicle side, preferably a plate of an axle means arranged vertically and in the longitudinal direction of the vehicle. To that effect, a mud plate is clamped between the plate on the vehicle side and an internally arranged flange of the axle journal, which mud plate, in drum-type brake designs, serves at the same time as a carrier unit for the brake cylinder and the brake bodies. Normally, a bipartite inner ring of an anti-friction bearing is arranged on the axle journal, with the outer ring thereof being forced into a wheel hub to be axially locked, for example, by a Truarc lock ring. The journal, at the end side thereof, is provided with a screw thread on which is mounted a nut by which the bipartite inner ring can be clamped for adjusting the anti-friction bearing. Secured to the wheel hub is a brake disc or brake drum, with a connection between wheel hub and brake disc or brake drum suitable for transmitting the brake forces being established only by the connecting means by way of which the wheel rim is secured to the wheel hub.

In addition, the anti-friction bearing industry has provided systems for bearing driven or non-driven vehicle wheels wherein the inner and/or the outer ring of the anti-friction bearing is of a special design in order to enable it to assume additional functions. Moreover, solutions are being offered in which the inner and/or the outer ring of the anti-friction bearing can be eliminated because the wheel hub and/or the axle journal are made of anti-friction bearing material so that they can be directly used as roll-off faces.

Although the number of bearing components can in this way be decreased, as a rule, larger quantities of high-quality anti-friction bearing material are to be employed so that no or, at best, negligible economic advantages can be achieved.

It is, therefore, the object of the invention to so improve a system of the afore-described type that the number of components of the bearing unit can be reduced with no need of using additional anti-friction bearing material and without hampering thereby the assembly.

SUMMARY OF THE INVENTION

To solve this problem, it is suggested that in the aforementioned arrangement for bearing a non-driven wheel, the wheel hub be formed integrally with a trunnion, that secured on the said trunnion is a one-piece or a two-piece inner ring of an anti-friction bearing, and that an axle body including a bore for receiving an outer ring of the anti-friction bearing is provided as the carrier unit.

In lieu of the conventional axle means having an assembly interface in the form of a plate arranged vertically and in the longitudinal direction of the vehicle, to which plate the axle journal has to be screwed, an axle body including a bore for accommodating the outer ring of the anti-friction bearing has now been provided by the invention, with the wheel hub being integrally formed with a trunnion on which can be arranged the inner ring of the anti-friction bearing. In the practice of the invention, the axle journal to be screwed to the axle arrangement on the vehicle side, along with the appertaining mounting means, and the screw thread for adjusting the anti-friction bearing can be eliminated. Instead, the inner ring of the anti-friction bearing is already completely connected to the trunnion of the wheel hub, preferably by roll-riveting and applying a pressing force, with the internal edge of the trunnion being outwardly folded and forced against the inner ring. The outer ring of the anti-friction roller, during assembly, is forced into the axle body and is circumferentially locked as will be explained hereinafter.

The axle body, preferably, is of an external circular-cylindrical configuration so that a structural unit comprising a mud plate, a brake cylinder and a brake body can be forced thereon. The structural unit can be circumferentially fixed to the axle body by means of one or more radially arranged nuts; at the same time the said nuts can be suitably used for locking the outer ring of the anti-friction bearing within the axle body. Finally, it is provided that the wheel hub, in known per se manner, has axially parallel bores for securing a wheel rim and a brake disc or brake drum.

Additional details of the invention will be described hereinafter in closer detail with reference to the example of embodiment as shown in FIG. 1.

BRIEF DESCRIPTION OF THE DRAWING

FIG. 1 is a sectional view of an arrangement of the invention for bearing a non-driven wheel of an automotive vehicle or the like.

DETAILED DESCRIPTION OF THE DRAWING

Figure 1:
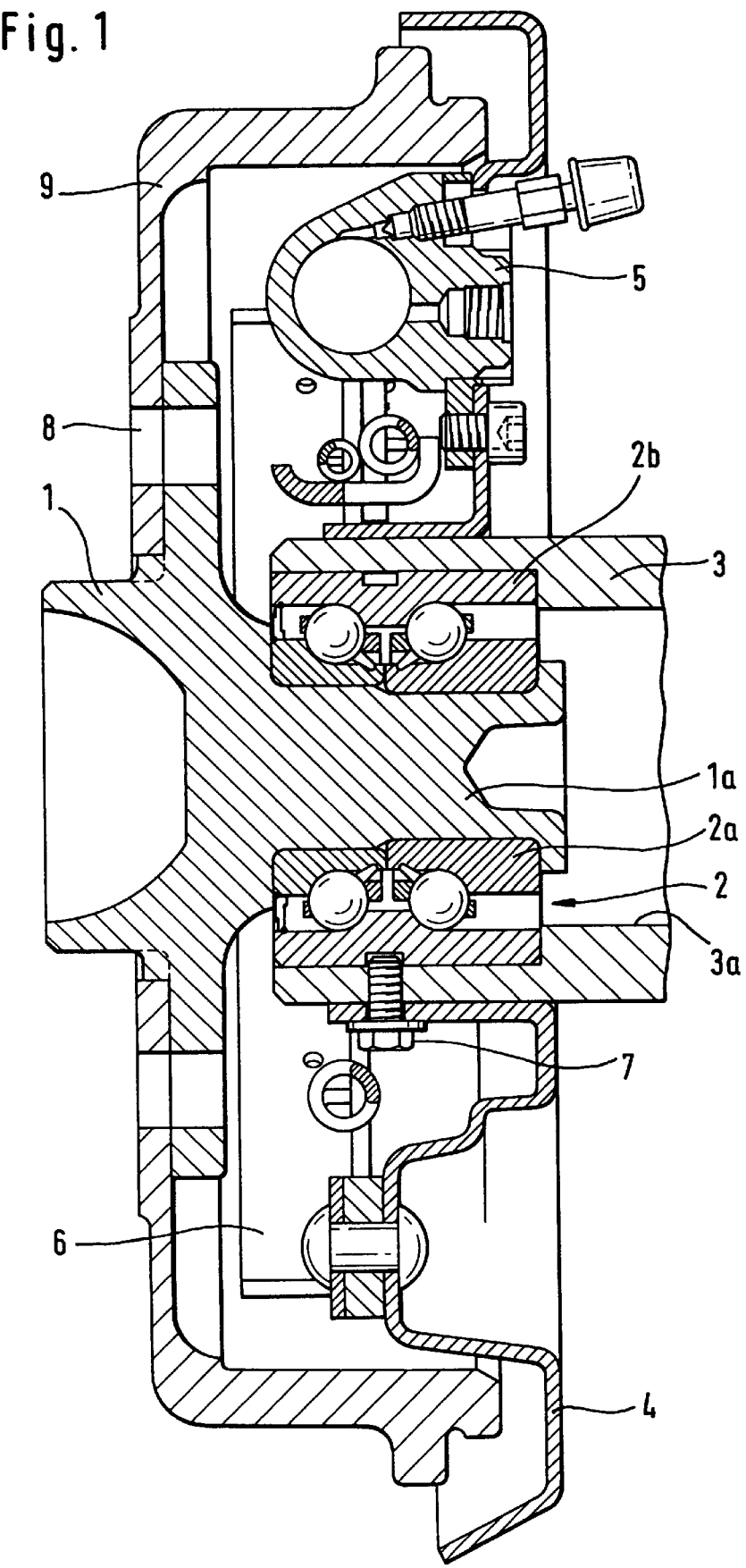

The wheel hub 1 is integrally formed with a trunnion 1a. An axle body 3 including a bore 3a for accommodating an outer ring 2b of an anti-friction bearing 2 is provided as a carrier component, and a one-piece or bipartite inner ring 2a of an anti-friction bearing 2 is secured to the trunnion 1a. The axial fixation and adjustment of the bearing are performed during pre-assembly, with an axially inwardly projecting edge of the trunnion 1a being outwardly folded by roll rivets and forced against the inner ring 2a of the anti-friction bearing. In this way, a precisely reproducible adjustment of the anti-friction bearing is achieved. Moreover, no adjustment is required during the final assembly which is welcomed by car manufacturers anxious to minimize final assembly efforts. The outer ring 2b of the anti-friction bearing 2 is forced into the axle body 3 and, in addition, is locked by at least one radially arranged nut 7. The said nut 7 at the same time will fix a mud plate 4 which serves as a carrier unit for a brake cylinder 5 and brake body 6 and which is externally pushed onto the cylindrically designed axle body 3 while forming a press fit. The mud plate in known per se manner also serves as a carrier unit for other components presently of no interest and, therefore, not described in any detail.

Mounted to the wheel hub 1 is a brake drum 9 which is connected to the wheel hub 1 in such a way as is adequate for bearing, transporting and assembling but not for transmitting the brake forces which are transmitted by the same connecting means provided for securing the wheel rim to the wheel hub. For that purpose, corresponding axially parallel bores 8 are provided in the wheel hub and in the wheel drum.

The system of the invention involves the advantage that no screwing operation is required for attachment to the axle arrangement on the vehicle side, and that fixation of the inner ring to the trunnion of the wheel hub is done by the manufacturer, thereby further simplifying the final assembly.

What is claimed:

1. An arrangement for bearing a non-driven wheel, comprising a carrier unit, a wheel hub, and anti-friction bearing with an inner and an outer ring, and a trunnion formed integrally with the wheel hub;

the inner ring of the anti-friction bearing being fixed to the trunnion; and the carrier unit being formed by an axle body including a bore for accommodating the external ring of the anti-friction bearing, wherein the structural unit is forced onto the axle body and, additionally, is locked by at least one radially arranged nut.

2. An assembly according to claim 1, wherein the inner ring of the anti-friction bearing is fixed to the trunnion by roll-riveting and applying a pressing force.

3. An assembly according to claim 1, wherein a structural unit comprising a mud plate, a brake cylinder and a brake body is externally secured to the axle body which has a substantially cylindrical shape.

4. An assembly according to claim 1, wherein the wheel hub comprises axially parallel bores for securing a wheel rim and a brake disc or brake drum.

5. An assembly accordingly to claim 1, wherein the hut at the same time serves to lock the external ring of the anti-friction bearing within the axle body.

6. An arrangement for bearing a non-driven wheel, comprising a carrier unit, a wheel hub, and anti-friction bearing with an inner and an outer ring, and a trunnion formed integrally with the wheel hub;

the inner ring of the anti-friction bearing being fixed to the trunnion; and the carrier unit being formed by an axle body including a bore for accommodating the external ring of the anti-friction bearing, wherein the wheel hub comprises axially parallel bores for securing a wheel rim and a brake disc or brake drum.

7. An assembly according to claim 6, wherein a structural unit comprising a mud plate, a brake cylinder and a brake body is externally secured to the axle body which has a substantially cylindrical shape.

8. An assembly according to claim 6, wherein the inner ring of the anti-friction bearing is fixed to the trunnion by roll-riveting and applying a pressing force.

\* \* \* \* \*